UNITED STATES PATENT OFFICE.

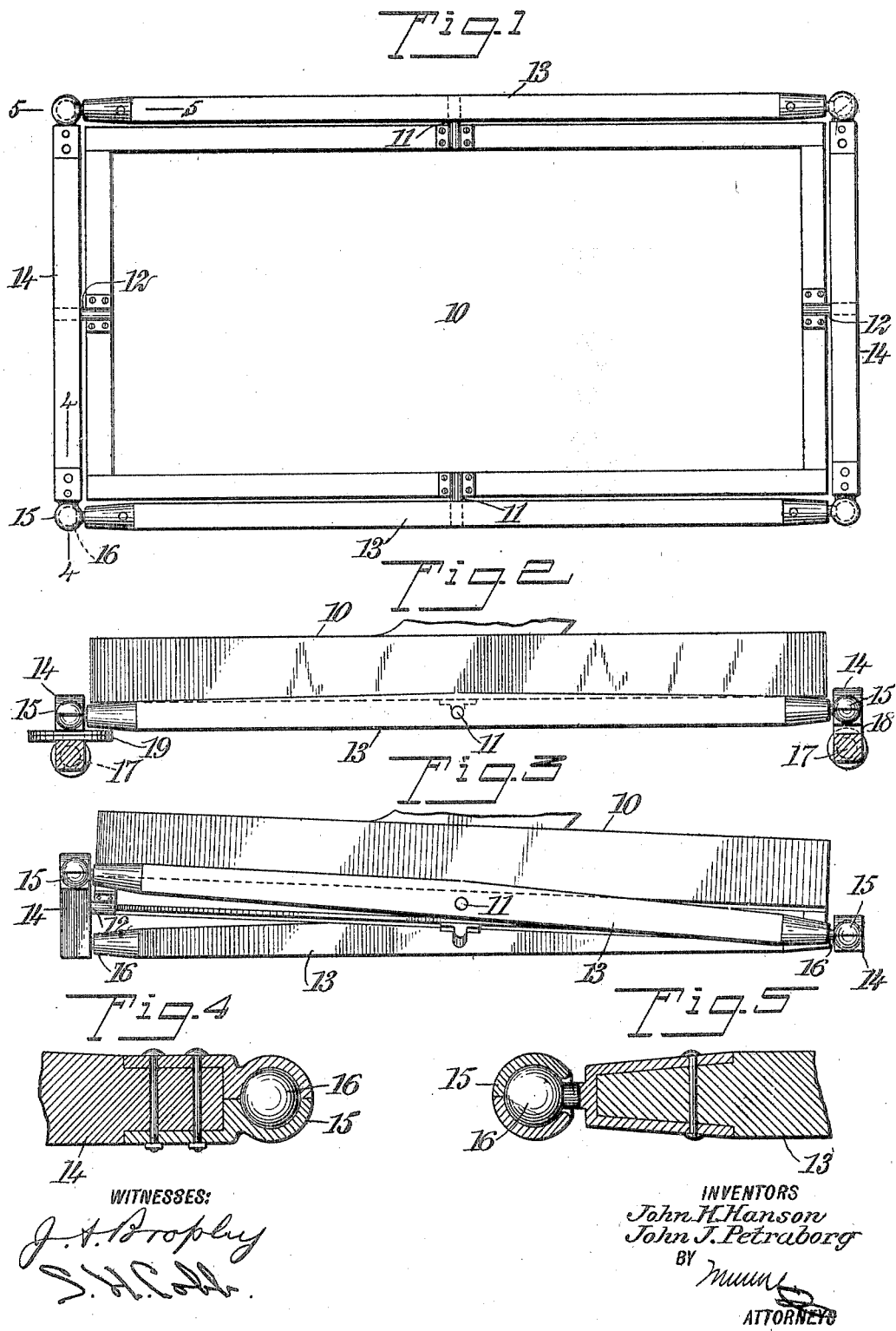

JOHN H. HANSON AND JOHN J. PETRABORG, OF AITKIN, MINNESOTA.

VEHICLE.

No. 812,037.  Specification of Letters Patent.  Patented Feb. 6, 1906.

Application filed February 23, 1905. Serial No. 246,871.

*To all whom it may concern:*

Be it known that we, JOHN H. HANSON and JOHN J. PETRABORG, citizens of the United States, and residents of Aitkin, in the county of Aitkin and State of Minnesota, have invented a new and Improved Vehicle, of which the following is a full, clear, and exact description.

Our invention relates to vehicles, and more particularly to the running-gear thereof. Its principal object is to equalize the movement of said running-gear.

Reference is to be had to the accompanying drawings, forming a part of this specification, in which similar characters of reference indicate corresponding parts in all the views.

Figure 1 is a bottom plan view of a vehicle embodying one form of our invention. Fig. 2 is a side elevation thereof, showing the frame in a normal or horizontal position. Fig. 3 is a similar view with the frame inclined; and Figs. 4 and 5 are sectional details on the lines 4 4 and 5 5, respectively, of Fig. 1.

10 designates the body of a vehicle, which has projecting from its sides and ends at or near their centers pairs of trunnions or pivot members 11 11 and 12 12, respectively. Upon the trunnions 11 are mounted opposite side bars 13 13, while upon the trunnions 12 are pivoted end bars 14 14. The bars extend from the trunnions into proximity with one another and are pivotally connected to furnish an equalizing-frame. In the present instance divided sockets 15 are secured upon the extremities of the end bars and receive balls 16, carried upon the ends of the side bars, so that upon the movement of any portion of this equalizing-frame the other elements may rock in unison upon the other trunnions. Adjacent to the connections between the bars are mounted supports for the vehicle, which may consist of either wheels or runners carried by axles 17, one of which is shown as projecting from a bolster 18, secured to an end bar, while the other axle may be joined to the opposite end bar through a fifth-wheel 19.

Considering, for example, that three of the vehicle wheels or supports are resting upon an elevated surface, while the fourth is in a depression below said surface, it will be seen that the side and end bars, which converge at this lowered wheel, will act as levers fulcrumed at their opposite ends, and since the vehicle-body is attached to them at points substantially midway of their length its downward movement will be but half that of the wheel and its angular movement but one-quarter of that, which would result in absence of our system of connecting the frame members. In consequence of the distribution of load the power required to raise the wheel from the depression will be reduced, and the lessening of the movement of the body will minimize the jolting effect and the strain upon the vehicle. It will therefore require less power to propel said vehicle, will lengthen its life, and render it more easy running. Used in connection with automobiles it will relieve the engine and its associated parts to a great extent from the ordinary wear and tear incurred. Obviously it will greatly reduce the liability of upsetting the vehicle or displacing its load.

Having thus described our invention, we claim as new and desire to secure by Letters Patent—

1. The combination with a vehicle-body, of side bars and end bars pivotally connected at their ends to one another, and each pivotally connected intermediate its ends to the vehicle-body.

2. The combination with a vehicle-body, of side bars and end bars each pivoted centrally to the respective sides and ends of the vehicle-body, and being pivotally connected with one another, and supports for the vehicle carried by sundry of said bars.

In testimony whereof we have signed our names to this specification in the presence of two subscribing witnesses.

JOHN H. HANSON.
JOHN J. PETRABORG.

Witnesses:
W. H. HARRISON,
B. J. RECK.